US007404189B2

(12) United States Patent
Benedetti

(10) Patent No.: US 7,404,189 B2
(45) Date of Patent: Jul. 22, 2008

(54) SCHEDULER SUPPORTING WEB SERVICE INVOCATION

(75) Inventor: Fabio Benedetti, Rome (IT)

(73) Assignee: International Business Machines Corporation, Armonk, NY (US)

( * ) Notice: Subject to any disclaimer, the term of this patent is extended or adjusted under 35 U.S.C. 154(b) by 726 days.

(21) Appl. No.: 10/880,860

(22) Filed: Jun. 30, 2004

(65) Prior Publication Data

US 2005/0149935 A1 Jul. 7, 2005

(30) Foreign Application Priority Data

Dec. 30, 2003 (EP) ................... 03368129

(51) Int. Cl.
*G06F 3/00* (2006.01)
*G06F 9/44* (2006.01)
*G06F 9/46* (2006.01)
*G06F 13/00* (2006.01)

(52) U.S. Cl. ...................... 719/317; 709/202
(58) Field of Classification Search ................. 719/317; 709/202
See application file for complete search history.

(56) References Cited

U.S. PATENT DOCUMENTS

| 5,596,750 | A | | 1/1997 | Li et al. | |
| 5,790,789 | A | * | 8/1998 | Suarez | 709/202 |
| 5,835,764 | A | * | 11/1998 | Platt et al. | 718/101 |
| 6,014,686 | A | * | 1/2000 | Elnozahy et al. | 709/202 |
| 6,237,005 | B1 | | 5/2001 | Griffin | |
| 6,256,771 | B1 | * | 7/2001 | O'Neil et al. | 717/100 |
| 6,263,358 | B1 | * | 7/2001 | Lee et al. | 718/100 |
| 6,542,922 | B1 | * | 4/2003 | Chessell et al. | 709/203 |

(Continued)

FOREIGN PATENT DOCUMENTS

JP PUPA 2004-062536 2/2004

(Continued)

OTHER PUBLICATIONS

Coulouris, G., Dollimore, J., and Kindberg, T., "Distributed Systems Concepts and Design," 1994, Addison-Wesley Publishers, Second, pp. 353-375 and 409-445.*

(Continued)

*Primary Examiner*—William Thomson
*Assistant Examiner*—KimbleAnn Verdi
(74) *Attorney, Agent, or Firm*—Francis Lammes; Stephen J. Walder, Jr.; Jeffrey S. LaBaw

(57) ABSTRACT

The present invention proposes a method and a corresponding system for scheduling invocation of web services from a central point of control. A scheduler accesses a workload database, which associates an execution agent and a descriptor with each submitted job. The descriptor identifies a desired web service, an address of a corresponding WSDL document, and the actual content of a request message to be passed to the web service. Whenever the job is submitted for execution, the scheduler sends the job's descriptor to the associated agent. In response thereto, the agent downloads the WSDL document that specifies the structure of the messages supported by the web service. The scheduler builds a request message for the web service embedding the desired content into the structure specified in the WSDL document. The agent sends the request message to an endpoint implementing the web service, so as to cause its invocation.

7 Claims, 6 Drawing Sheets

U.S. PATENT DOCUMENTS

| | | | |
|---|---|---|---|
| 7,086,063 B1* | 8/2006 | Ousterhout et al. | 718/106 |
| 7,124,415 B1* | 10/2006 | Luft | 719/317 |
| 2002/0101860 A1* | 8/2002 | Thornton et al. | 370/352 |
| 2002/0103851 A1* | 8/2002 | Kikinis | 709/202 |
| 2002/0138638 A1* | 9/2002 | Hermann et al. | 709/230 |
| 2002/0161814 A1* | 10/2002 | Wical | 709/101 |
| 2003/0204547 A1* | 10/2003 | Davis et al. | 709/101 |
| 2003/0236824 A1 | 12/2003 | Alsafadi et al. | |
| 2004/0107196 A1* | 6/2004 | Chen et al. | 707/4 |
| 2004/0123296 A1* | 6/2004 | Challenger et al. | 718/102 |
| 2004/0133656 A1* | 7/2004 | Butterworth et al. | 709/219 |
| 2005/0155042 A1* | 7/2005 | Kolb et al. | 719/318 |
| 2007/0005777 A1* | 1/2007 | Fremantle et al. | 709/228 |

FOREIGN PATENT DOCUMENTS

| | | | |
|---|---|---|---|
| JP | PUPA 2004-361993 | | 12/2004 |
| WO | WO 99/23784 | | 5/1999 |

OTHER PUBLICATIONS

Glass, G., "Web Services Building Blocks for Distributed Systems," 2002, Prentice Hall Ptr, pp. 55-70 and 117-149.*

Hoschek, W., "The Web Service Discovery Architecture," 2002, IEEE Computer Society Press, Proceedings of the 2002 ACM/IEEE Conference on Supercomputing, Conference on High Performance Networking and Computing, pp. 1-15.*

Benatallah, B., Dumas, M., Fauvet, M., Rabhi, F. A., and Sheng, Q. Z., "Overview of some patterns for architecting and managing composite web services,", Jun. 2002, ACM, SIGecom Exch. 3, 3, pp. 9-16.*

Uk, B.; Taufer, M.; Stricker, T.; Settanni, G.; Cavalli, A., "Implementation and characterization of protein folding on a desktop computational grid. Is CHARMM a suitable candidate for the United Devices and MetaProcessor?," Apr. 2003, Parallel and Distributed Processing Symposium, Proceedings, pp. 10, 22-26.*

Medjahed, B., Benatallah, B., Bouguettaya, A., Ngu, A., and Elmagarmid, A, "Business-to-business interactions: issues and enabling technologies", May 2003, The VLDB Journal 12, 1, pp. 59-85.*

Mikio Aoyama, "Creation of Next Generation Information Systems Besed on Software Services Engineering", Transactions of The Institute of Electrical Engineers of Japan, May 1, 2002, vol. 122-C, No. 5, pp. 737-743.

* cited by examiner

SCHEDULER SUPPORTING WEB SERVICE INVOCATION

TECHNICAL FIELD

The present invention relates to the data processing field, and more specifically to a scheduling method and a corresponding system.

BACKGROUND ART

Scheduling methods are commonly used in a data processing system for controlling submission of different work units (for example, jobs in a batch processing). For this purpose, several types of schedulers have been proposed in the last years to automate the submission of large quantities of jobs. An example of scheduler is the "Tivoli Workload Scheduler" by IBM Corporation.

A scheduler submits the jobs according to a predefined plan, which establishes a desired flow of execution of the jobs. Whenever a job must be submitted, the scheduler dispatches an execution request to a corresponding agent; the agent directly controls the execution of the job and returns feedback information to the scheduler. In this way, the scheduler provides a single central point of control for all the jobs.

Moreover, most of the available schedulers offer additional services. Typically, the schedulers are very sophisticated in handling temporal and predecessor constraints (for example, defined by the completion of other jobs or by the availability of system resources). The schedulers can also be provided with a Graphical User Interface (GUI), which allows creating, modifying and deleting the definition of the jobs or plans, and which allows controlling and monitoring the operations performed by the scheduler. Moreover, some schedulers integrate performance monitoring, load balancing and/or reporting functions.

A drawback of the schedulers known in the art is that they are specifically designed for working in a close environment within a company. Indeed, the schedulers typically submit the work units for execution on a single computer (wherein the scheduler itself is running), or at most support the managing of a cluster of computers being connected through a private network of the company.

In any case, no scheduler known in the art can be used in an open environment to control the invocation of external services (typically provided by third parties). Indeed, the external services can be accesses in a number of ways, which are generally incompatible with the requirements of the scheduler.

This problem has been exacerbated by the widespread diffusion of the INTERNET, and particularly of web services. A web service (also called application service) consists of a collection of functions that can be exploited by other applications through an interface defined in a standardized way (irrespective of the actual implementation of the offered functions). The web services are accessed via ubiquitous protocols and data formats (such as the HTTP, SOAP and XML). In this way, the web services have become the standard platform for application integration, being the fundamental building blocks in the move to distributed computing on the INTERNET.

Therefore, the limitations of the available schedulers strongly hinders the full exploitation of the INTERNET; particularly, this impairs the interoperability of legacy applications with web services provided by third parties (for example, when implementing online transactions in e-commerce applications).

SUMMARY OF THE INVENTION

It is an object of the present invention to enable a scheduler to manage external services.

Particularly, it is an object of the present invention to allow the scheduler to invoke the external services.

It is another object of the present invention to provide a scheduling method that can be used in heterogeneous environments.

It is yet another object of the present invention to support the integration of the scheduler with the external services.

Particularly, it is an object of the present invention to exploit the additional functions already available in the scheduler for managing the external services.

The accomplishment of these and other related objects is achieved by a method of scheduling execution of work units in a data processing infrastructure with a distributed architecture, the method including the steps under the control of a central scheduling application of: associating at least one of the work units with a descriptor including an indication of an external service being accessible according to a predefined interface document, submitting the work units for execution according to a predefined plan, retrieving the interface document of each external service associated with the submitted work units, building a request message for each external service associated with the submitted work units according to the corresponding interface document, and sending each request message to the corresponding external service to cause the invocation of the external service.

The present invention also provides a computer program for performing the method and a product embodying the program. A corresponding system for scheduling execution of work units and a data processing infrastructure including the system are also encompassed.

The novel features believed to be characteristic of this invention are set forth in the appended claims. The invention itself, however, as well as these and other related objects and advantages thereof, will be best understood by reference to the following detailed description to be read in conjunction with the accompanying drawings.

DETAILED DESCRIPTION OF THE PREFERRED EMBODIMENT(S)

Figure 1A:
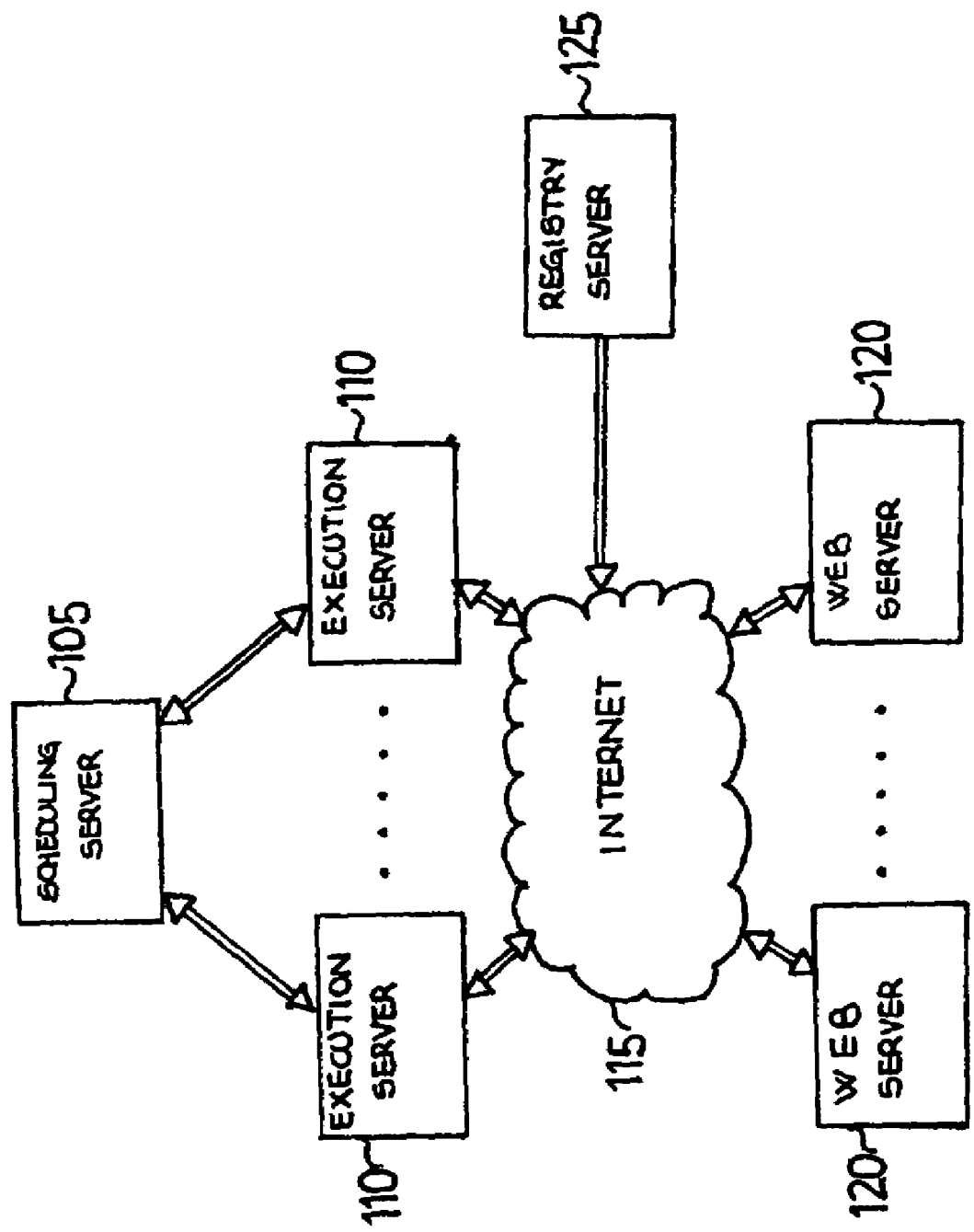
FIG. 1a is a schematic block diagram of a data processing infrastructure in which the method of the invention is applicable.

With reference in particular to FIG. 1a, a schematic block diagram of a data processing infrastructure 100 with a distributed architecture is illustrated. The infrastructure 100 includes a central scheduling server 105, which is used to submit non-interactive jobs. The scheduling server 105 communicates with multiple servers 110 controlling the actual execution of the jobs. One or more of the execution servers 110 accesses a global network 115, typically consisting of the INTERNET. As a consequence, these execution servers 110 can interact with multiple web servers 120 providing corresponding services (for example, implementing storage or customer relationship management). The web services made available in the INTERNET 115 are listed in a distributed registry, which is implemented by a set of corresponding servers 125.

More in detail, the distributed registry consists of an XML-based document conforming to the UDDI (Universal Description, Discovery and Integration) specification. The web services provided by each business organization are specified in a WSDL (Web Services Description Language) document. The WSDL document consists of a set of XML-based definitions, which are split into abstract definitions and concrete definitions (so as to allow reusing the abstract definitions for different technologies). Particularly, the abstract definitions are comprised of types (specifying data types relevant for the web services), messages (specifying the types of data being exchanged), operations (specifying supported actions in terms of the messages involved), and portType (grouping related operations). On the other hand, the concrete definitions are comprised of bindings (associating concrete protocol and data format specification to operations and messages for the portTypes), ports (specifying network addresses for the web servers implementing the portTypes) and services (grouping related ports). Moreover, the WSDL specification supports extendibility elements, which can be used to provide information specific for particular technologies (either in the abstract definitions or in the concrete definitions).

The definitions of the WSDL document are enclosed within the following element:

```
<definitions name=myName targetNamespace=myNamespace>
    ....
<\definitions>
```

The attributes "name" and "targetNamespace" can be optionally used to identify the WSDL document in a lightweight form. Particularly, the attribute "name" provides the name assigned to the WSDL document ("myName"), and the attribute "targetNamespace" specifies a corresponding namespace ("myNamespace"). The namespace consists of a unique identifier that is used to qualify the name; the namespace is commonly given the URI (Uniform Resource Identifier) of a desired web point of content (for example, a web site address).

The types are defined by the following statement:

```
<types>
    <schema targetNamespace=mySchema>
        ....
    </schema>
</types>
```

The tag "schema" can be used to specify the URI of a desired schema ("mySchema"); the schema provides an abstract representation of the data types according to the XSD (XML Schema Definition) specification. Alternatively, specific data types can be added via extensibility elements (providing an XML container for the type definitions). Preferably, basic data types are defined with the following form:

```
<element name=myElement type=myType/>
``` wherein the attribute "name" provides a unique name of the data type within the WSDL document ("myElement") and the attribute "type" references the desired data type. Conversely, complex data types are defined combining multiple data types with the following form:

```
<element name=myElement>
    <complexType>
        <all>
            ....
        </all>
    </complexType>
</element>
```

Each message consists of one or more parts, which represent its logical components:

```
<message name=myMessage>
    <part name=myPart element=myElement type=myType/>
    ....
</message>
```

The attribute "name" of the message provides a unique name within the WSDL document ("myMessage"). For each message part, the attribute "name" defines a unique name within the message ("myPart"); the message part includes one or more parameters, each one consisting of an attribute "element", specifying the name of the parameter ("myElement"), and an attribute "type", referencing its type ("myType").

The definition of each portType (with the corresponding operations) has the following syntax:

```
<portType name=myPortType>
    <operation name=myOperation>
        <.... name=myMessage message=myDefinition/>
    </operation>
    ....
</portType>
```

The attribute "name" of the portType provides a unique name within the WSDL document ("myPortType"). For each operation, the attribute "name" defines a unique name within the portType ("myOperation"). The operation consists of one or more messages (qualified by a corresponding element, as described in the following); each message is defined by an attribute "name", specifying the name of the message ("myMessage"), and an attribute "message", referencing its abstract definition ("myDefinition"). In addition, a further attribute "parameterOrder" may be used to specify an actual signature of the operation (via an ordered list of its parameters).

The WSDL supports four operation types: one-way (wherein a message is received only), request-response (wherein a message is sent and a correlated message is received), solicit-response (wherein a message is received and a correlated message is sent), and notification (wherein a message is received only).

The One-way Operation:

```
<operation name=myOperation>
    <input name=myInput message=myInputDefinition/>
</operation>
``` includes an element "input" for the request.

The Request-response Operation:

```
<operation name=myOperation>
    <input name=myInput message=myInputDefinition/>
    <output name=myOutput message=myOutputDefinition/>
    <fault name=myFault message=myFaultDefinition/>
</operation>
``` includes an element "input" for the request, an element "output" for the response, and an element "fault" for any error that may be returned as a result of the operation.

Similar Messages are Included in the Solicit-response Operation:

```
<operation name=myOperation>
    <output name=myOutput message=myOutputDefinition/>
    <input name=myInput message=myInputDefinition/>
    <fault name=myFault message=myFaultDefinition/>
</operation>
``` and in the notification operation:

```
<operation name=myOperation>
    <output name=myOutput message=myOutputDefinition/>
</operation>
```

In order to avoid having to name each message within an operation, the WSDL provides some default values. Particularly, if the attribute "name" is not specified for the single message of a one-way or notification operation, the name of the message defaults to the one of the operation; likewise, if the elements "name" are not specified for the input/output messages of a request-response or solicit-response operation, the names of the messages default to the one of the operation with "request"/"solicit" or "response" appended, respectively.

The binding of each portType is provided by the following element:

```
<binding name=myBinding type=myPortType>
    ....
    <operation name=myOperation>
        ....
        <input name=myInput>
            ....
        </input>
        <output name=myOutput>
            .....
        </output>
        <fault name=myFault>
            ....
        </fault>
    </operation>
</binding>
```

The attribute "name" provides a unique name for the binding within the WSDL document ("myBinding"); the attribute "type" references the portType that is bound ("myPortType"). Extendibility elements are used to add further information on the binding and to specify the concrete grammar for each operation and any corresponding input, output and fault message.

The definition of each service (with the corresponding ports) has the following syntax:

```
<service name=myService>
    <port name=myPort binding=myBinding>
        ....
    </port>
    ....
</service>
```

The attribute "name" of the service provides a unique name within the WSDL document ("myService"). For each port, the attribute "name" provides a unique name within the WSDL document ("myPort"); the attribute "binding" refers to the corresponding binding ("myBinding"). Extendibility elements are used to specify concrete network addresses of one or more web servers (also called endpoints), which actually implement the operations of the corresponding portType. If the service has multiple ports that share a portType, these ports provide a semantically equivalent behavior (but employing different bindings or endpoints).

Preferably, the definitions of the web services are separated into independent documents, which are included using corresponding elements ("import"). Moreover, an element "documentation" can be used in any definition for providing human readable information.

The WSDL is extended with specific binding elements for the most common standard protocols, such as the SOAP (Simple Object Access Protocol). The SOAP is a protocol that has been specifically designed for allowing programs running in any kind of operating systems to communicate; particularly, one of the design goals of the SOAP is to encapsulate remote procedure calls (or RPCs).

The SOAP involves the exchange of messages between nodes; in detail, the SOAP messages travel from an initial sender node to an ultimate receiver node, possibly by passing through a set of intermediary nodes along the corresponding path. Each SOAP message consists of an XML-based document with the following structure:

```
<env:Envelope
    xmls:env=myNamespace env:encodingStyle=myEncodingStyle>
    <env:Header>
        ....
    </env:Header>
    <env:Body>
        ....
    </env:Body>
</env:Envelope>
```

The SOAP message is enclosed in an envelope, which is defined by the element "env:Envelope". The attribute "xmls:env" allows specifying a corresponding namespace ("myNamespace"); moreover, the attribute "env:encodingStyle" is used to provide the URI ("myEncodingStyle") qualifying the content of the SOAP message (according to corresponding rules that are used to serialize its content).

The envelope includes a header (defined by the element "env:Header") and a body (defined by the element "env:Body"), typically organized into sub-elements (called blocks); the SOAP specification only determines how these elements are handled, but not their contents (which are application dependent).

Particularly, the header is an optional element that can be used to provide additional services, many of which involve the participation of the intermediary nodes. The blocks of the header are targeted at various nodes that might be encountered along the message path; those nodes are identified by their roles, which can be specified by an attribute "env:role". Some standardized roles are defined in the SOAP specification, such as "none" (meaning that no node should process the header block), "next" (relating to the next node encountered in the message path) or "ultimateReceiver" (for the receiver node). If the attribute "env:role" is missing, the header block is targeted at the receiver node. The way in which each node assumes a particular role is not part of the SOAP specification (but it is determined at the application level).

Each intermediary node receiving the SOAP message processes the header blocks intended for its role (if possible) and then relays the SOAP message along the desired path. By default, the header blocks targeted at the intermediary node are removed from the outbound SOAP message (however, they may be reinserted, either unchanged or with their contents altered, as a result of the processing). When a header block must be targeted at any capable intermediary node, an attribute "env:relay" with the value "true" is added; in this case, each header block targeted at the intermediary node is forwarded in the event that it cannot be processed. An optional attribute "env:mustUnderstand" with the value "true" can be inserted to indicate that the intermediary node must absolutely process the header blocks intended for its role in a manner consistent with their specification; on the contrary, the SOAP message is not relayed and a fault exception is thrown (as described in the following). This feature ensures that the header blocks being important to the overall purpose of the application would not be ignored.

On the other hand, the body is a mandatory element that must be processed by the receiver node. Typically, in an RPC application the body is used to invoke a procedure on the receiver node; for this purpose, the body provides the identities and values of any input parameters to be passed to the procedure. In response thereto, the receiver node returns a SOAP message with a body providing the identities and values of any output parameters. The SOAP for RPC offers a way to distinguish a return code of the procedure from the other output parameters; the return code is identified by an element "rpc:result", which contains the return code directly or a sub-element "m:status" (which in turn contains the actual return code).

The SOAP specification provides a model for handling situations wherein faults arise in the processing of the SOAP message. For this purpose, all the faults are reported using a single element "env:Fault" in the body of a SOAP message. The element "env:Fault" includes two mandatory sub-elements "env:Code" and "env:Reason". The element "env:Code" consists of a mandatory sub-element "env:Value" (which provides a standardized identifier of the fault) and an optional sub-element "env:Subcode" (further qualifying the fault). The element "env:Reason" provides a human readable explanation of the fault. The element "env:Fault" can also include a sub-element "env:Node" for identifying the node that has generated the fault (its absence implies the fault has been generated by the receiver node). A further optional sub-element "env:Role" specifies the role being played by the node that has generated the fault.

The SOAP message must be bound to an underlying concrete transport protocol. For each node along the message path, the transport protocol provides a serialized representation of the SOAP message that can be conveyed to the next node (with each node that may support a different transport protocol). In addition, the transport protocol implements different features that are needed to the application. A particular feature defines a message exchange pattern that is supported by the transport protocol. For example, a request-response pattern provides the ability to correlate a SOAP message acting as a request with a SOAP message acting as a response (which SOAP messages are exchanged between two adjacent nodes); conversely, a response pattern consists of a non-SOAP request that is followed by a corresponding SOAP response. The transport protocol also offers a general feature, which allows application full control over the choice of the actual method to be called on the receiver node.

The SOAP specification supports the most common transport protocols, such as the HTTP. The HTTP provides a communication model wherein a client identifies a server with a URI, connects to the server using the underlying TCP/IP protocol, issues a HTTP request and receives a HTTP response over the same connection; the HTTP binding supports either the request-response pattern (using the POST web method) or the response pattern (using the GET web method). In this case, the request/response functionality is provided in a native way (so that no further support needs be required at the application or SOAP level).

Referring back to the WSDL document, the binding for the SOAP protocol is signified by the following statement within the corresponding element:

<soap:binding transport=myTransport
       style=myDefaultStyle>

The attribute "transport" indicates the corresponding transport protocol ("myTransport", such as the HTTP); as described in the following, the attribute "style" specifies the default style for each contained operation ("myDefaultStyle").

The binding element then includes the concrete definition of each operation supported by the corresponding portType. Information for the operation as a whole is provided by the following statement:

<operation soapAction=myAction style=myStyle>

The attribute "soapAction" specifies the actual action to be executed for this operation ("myAction"); for example, in the HTTP binding the action defines the header of the corresponding HTTP request. The attribute "style" indicates whether the operation is RPC-oriented (i.e., containing input/output parameters) or document-oriented (i.e., containing one or more text documents). If the attribute "style" is not specified, it defaults to the value indicated in the element "soap:binding"; if this element does not specify any style, it is assumed to be "document". The value of the attribute "style" affects how the information is assembled in the body of the SOAP message. Particularly, in a document-oriented operation the document is embedded in the body directly; conversely, in an RPC-oriented operation each parameter appears inside a wrapper, which is named identical to the parameter. Each message is defined by the following statement:

```
<soap:body parts=myParts use=myUse
    encodingStyle=myEncodingStyle
    namespace=myNamespace/>
```

The optional attribute "parts" indicates the message parts that appear in the body ("myParts"); if this attribute is omitted, all the message parts are assumed to be included in the body. The mandatory attribute "use" indicates a type of definition of the message ("myUse"); the attribute "use" has the value "literal" when the message defines a concrete schema of the message, or the value "encoded" when the message defines an abstract specification that is serialized using some encoding rules. The attribute "encodingStyle" specifies the list of URIs identifying the encoding rules ("myEncodingStyle"), from the most restrictive one to the least restrictive one. The attribute "namespace" provides the namespace that must be input to the encoding ("myNamespace").

The binding also includes the definition of the header that can be inserted in the envelope:

```
<soap:header message=myMessage part=myPart
    use=myUse encodingStyle=myEncodingStyle
    namespace=myNamespace/>
```

The attributes "message" and "part" together reference the message part that appears in the header; the attributes "use", "encodingStyle" and "namespace" are exploited in the same way as with the element "body". An optional element "headerfault" (having the same syntax of the element "header") allows specifying the header that is used to transmit corresponding error information.

The binding ends with the specification of the address of the relevant endpoint:

```
<soap:address location=myLocation/>
```

The attribute "location" provides the URI of the web server implementing the endpoint ("myLocation").

A more detailed description of the WSDL specification can be found in the document "Web Services Description Language (WSDL) 1.1" and a more detailed description of the SOAP specification can be found in the document "SOAP Version 1.2 Part O:Primer", both of them available at the World Wide Web Consortium (W3C) website.

Figure 1B:
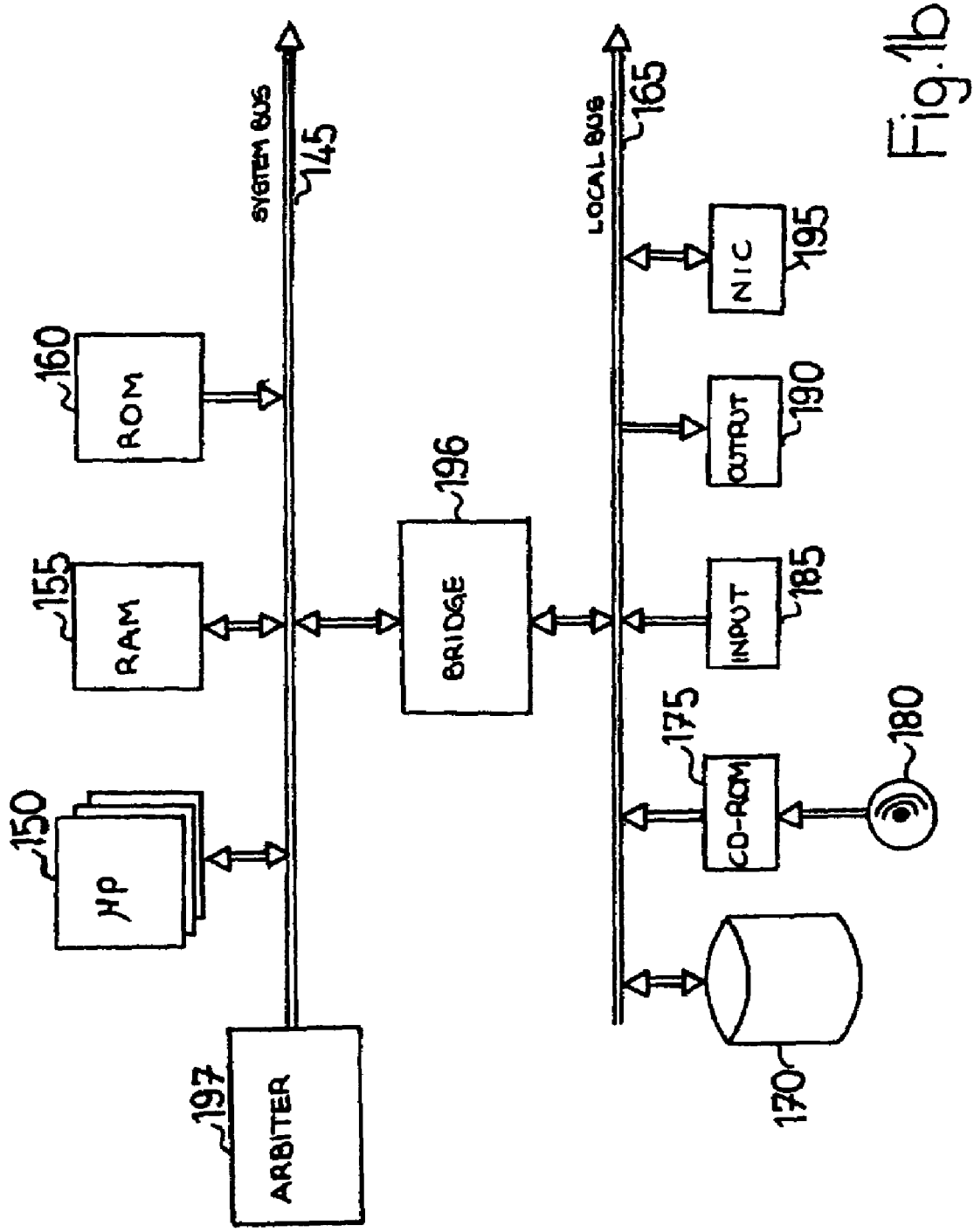
FIG. 1b shows the functional blocks of a generic computer of the infrastructure.

As shown in FIG. 1b, a generic computer of the above-described infrastructure (scheduling server, execution server, web server and registry server) is formed by several units that are connected in parallel to a system bus 145. In detail, one or more microprocessors (μP) 150 control operation of the computer; a RAM 155 (typically consisting of interleaved modules) is directly used as a shared working memory by the microprocessors 150, and a ROM 160 stores basic code for a bootstrap of the computer. Peripheral units are clustered around a local bus 165 (by means of respective interfaces). Particularly, a mass memory consists of one or more hard-disks 170 and drivers 175 for reading CD-ROMs 180. Moreover, the computer includes input devices 185 (for example, a keyboard and a mouse), and output devices 190 (for example, a monitor and a printer). A network Interface Card (NIC) 195 is used to connect the computer to the INTERNET. A bridge unit 196 interfaces the system bus 145 with the local bus 165. Each microprocessor 150 and the bridge unit 196 can operate as master agents requesting an access to the system bus 145 for transmitting information. An arbiter 197 manages the granting of the access with mutual exclusion to the system bus 145.

Similar considerations apply if the data processing infrastructure has another architecture or if each computer has an equivalent structure (for example, with different units). Moreover, the web services can be bound to other protocols (such as the HTTP GET & POST or the MIME), or the SOAP messages can be conveyed in a different way (for example, within e-mails); more generally, the concepts of the present invention are also applicable when the web services implement different functions or are accessible according to equivalent interface documents (even if defined with a different language).

Figure 2:
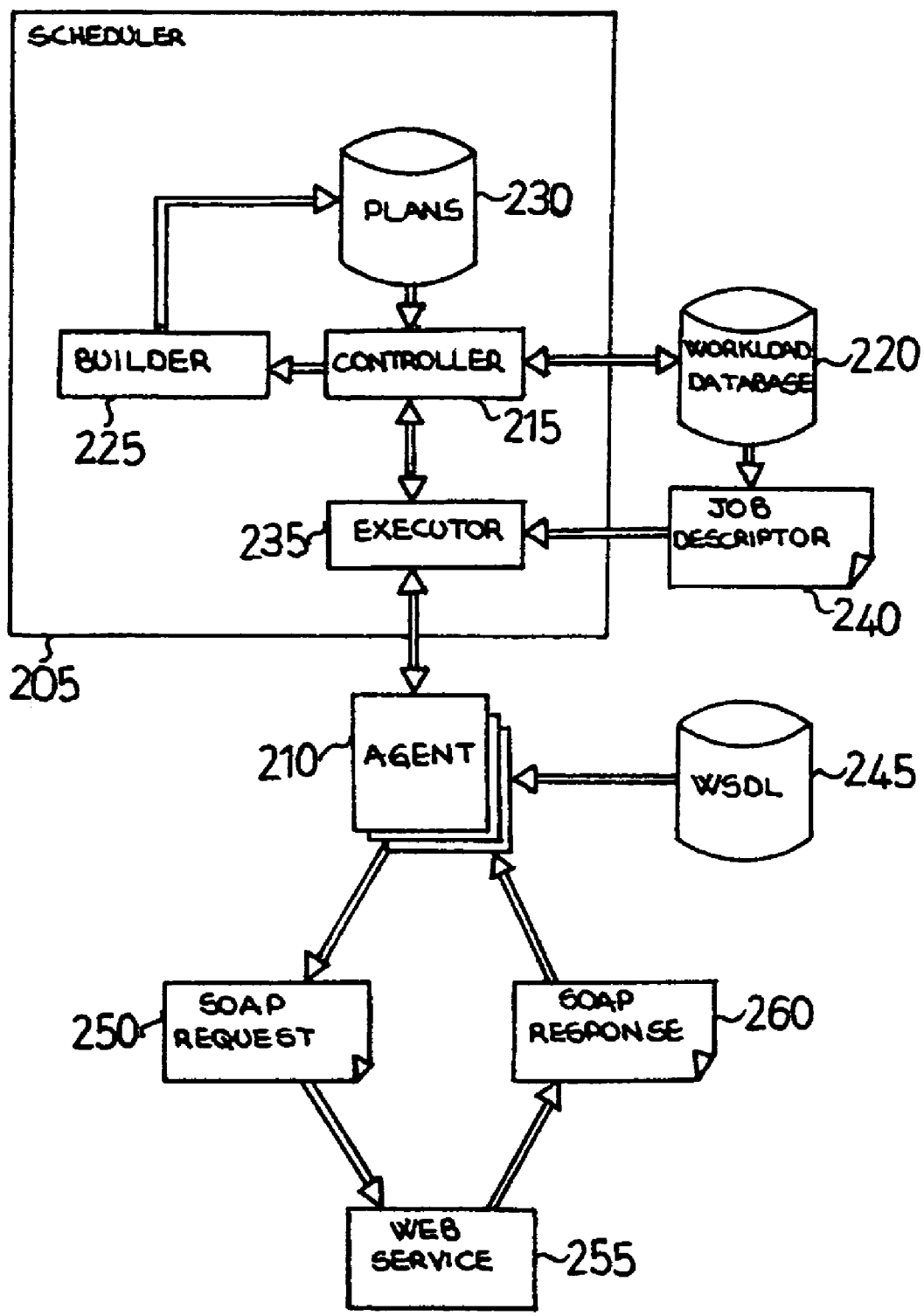
FIG. 2 depicts the main software components that can be used for practicing the method.

Moving to FIG. 2, the main software components that can be used to practice the method of the invention are depicted. The information (programs and data) is typically stored on the different hard-disks and loaded (at least partially) into the corresponding working memories when the programs are running, together with an operating system and other application programs (not shown in the figure). The programs are initially installed onto the hard disks from CD-ROMs.

Particularly, a central scheduling application controls the execution of the different jobs (typically during the evening); for example, the jobs consist of payroll programs, cost analysis applications, and the like. The central scheduling application is composed of a job scheduler 205 and one or more agents 210, which are installed on the corresponding servers.

The scheduler 205 includes a controller 215 for managing the submission of the jobs. The controller 215 accesses a workload database 220 that stores information about the different jobs. For each job, the workload database 220 includes a descriptor, a planned time of execution, an estimated duration, and any dependency from other jobs or resources of the system.

The descriptor identifies the agent 210 that is delegated to control the execution of the job. In a standard scenario, each agent 210 executes one or more (local) jobs directly; in this case, the descriptor of each local job specifies the corresponding steps (using a suitable control language, such as the JCL). In addition or in alternative, the proposed solution further supports the submission of (remote) jobs, which involve the invocation of web services. In this case, the descriptor of each remote job identifies the WSDL document pertaining to the corresponding web service. The descriptor further specifies the name of the involved service (as defined in the WSDL document); moreover, the descriptor identifies the port (in the service) and the operation (in the port). The descriptor then includes payload information defining a content of the message to be passed to the web service. Typically, the payload information consists of a list of input parameters; some of the input parameters can be symbolic variables to be resolved at run-time before invoking the web service. Alternatively, the payload information consists of a simple document. In addition, the descriptor can include authentication information (such as userid and password), which authentication information is required by the web service to authorize its invocation.

For example, the descriptor for a generic remote job has the following format:

```
agent = myAgent
WSDLDocument = myWSDL
userid = myUserid
password = myPassword
serviceNameSpace = myNameSpace
```

-continued

```
serviceName = myService
portName = myPort
operationName = myOperation
messageContent =
    <myParameter>myValue</myParameter>
    ....
```

The field "agent" provides a network address of the associated agent ("myAgent") and the field "WSDLDocument" specifies the URI pointing to the WSDL document ("myWSDL"). The fields "userid" and "password" identify the userid ("myUserid") with its password ("myPassword"). The fields "serviceNameSpace" and "serviceName" provide the namespace ("myNameSpace") and the name ("myService"), respectively, of the involved service, and the fields "portName" and "operationName" specify the port ("myPort") and the operation ("myOperation"). The field "messageContent" provides the payload information. Each input parameter is enclosed within a wrapper with an identical name ("myParameter"); the input parameter consists of either a value or a symbolic variable (for example, identified by a name starting with the symbol "$").

The controller 215 transmits information about each job to be executed (stored in the workload database 220) to a builder 225. The builder 225 creates one or more plans for controlling a flow of execution of batches of jobs in a desired sequence (for example, covering a period of 24 hours). Each plan is built according to several factors; typically, the factors affecting the flow of execution include temporal values (such as date, time, day of the week) and dependencies (such as completion of predecessor jobs or system resource availability). The plans are stored into a corresponding repository 230. A selected plan from the repository 230 is supplied, through the controller 215, to an executor 235. The executor 235 submits the jobs of the plan; for this purpose, the executor 235 retrieves (from the workload database 220) and transits the descriptor of each submitted job, denoted with 240, to the assigned agent 210.

Each agent 210 controls the execution of the corresponding jobs. Particularly, the steps of each local job are performed by the agent 210 directly. Conversely, for each remote job the agent 210 retrieves the WSDL document of the corresponding web service (denoted with 245) from the URI specified in the descriptor 240. As explained in the following, the agent 210 builds a SOAP request 250, which is transmitted to the web service to be invoked (denoted with 255). The web service 255 returns a SOAP response 260 to the agent 210 (if necessary). Once the execution of a generic local or remote job terminates (because all the operations have been completed or an error has occurred), the corresponding agent 210 passes feedback information to the controller 215 (via the executor 235); the feedback information includes an actual start time and an actual end time of the job, a return code specifying the result of the operations, and any output data produced by the job. The controller 215 uses this information to update the workload database 220 accordingly.

Similar considerations apply if the programs and the corresponding data are structured in another way, if different modules or functions are supported, or if the programs are provided on an equivalent computer readable medium (such as a DVD). Alternatively, the jobs are associated with the corresponding descriptors in a different way (for example, using a lookup table), the workload database stores equivalent information, or the scheduler only passes a pointer to the descriptor of each submitted job to the corresponding agent. Moreover, the descriptor can have a different structure (for example, consisting of one or more separate files), or the payload information can be provided in other formats (such as with a list of type/value pairs, each one for a corresponding input parameter). In any case, the invention is also suitable to be used for scheduling submission of different jobs, interactive tasks, or more generally any other work units.

Figure 3A:
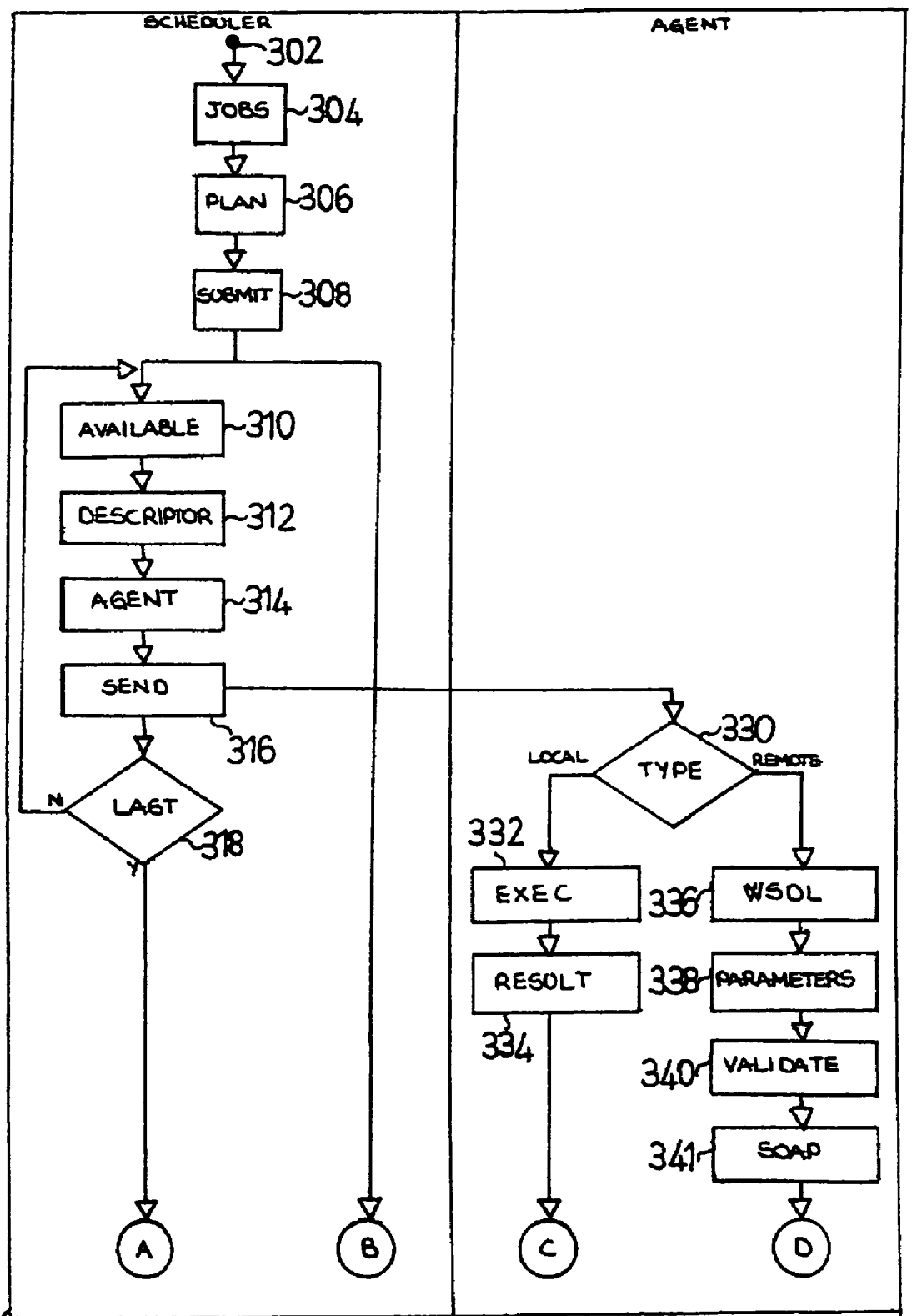
FIGS. 3a-3c show a diagram describing the flow of activities relating to an illustrative implementation of the method.
Figure 3B:
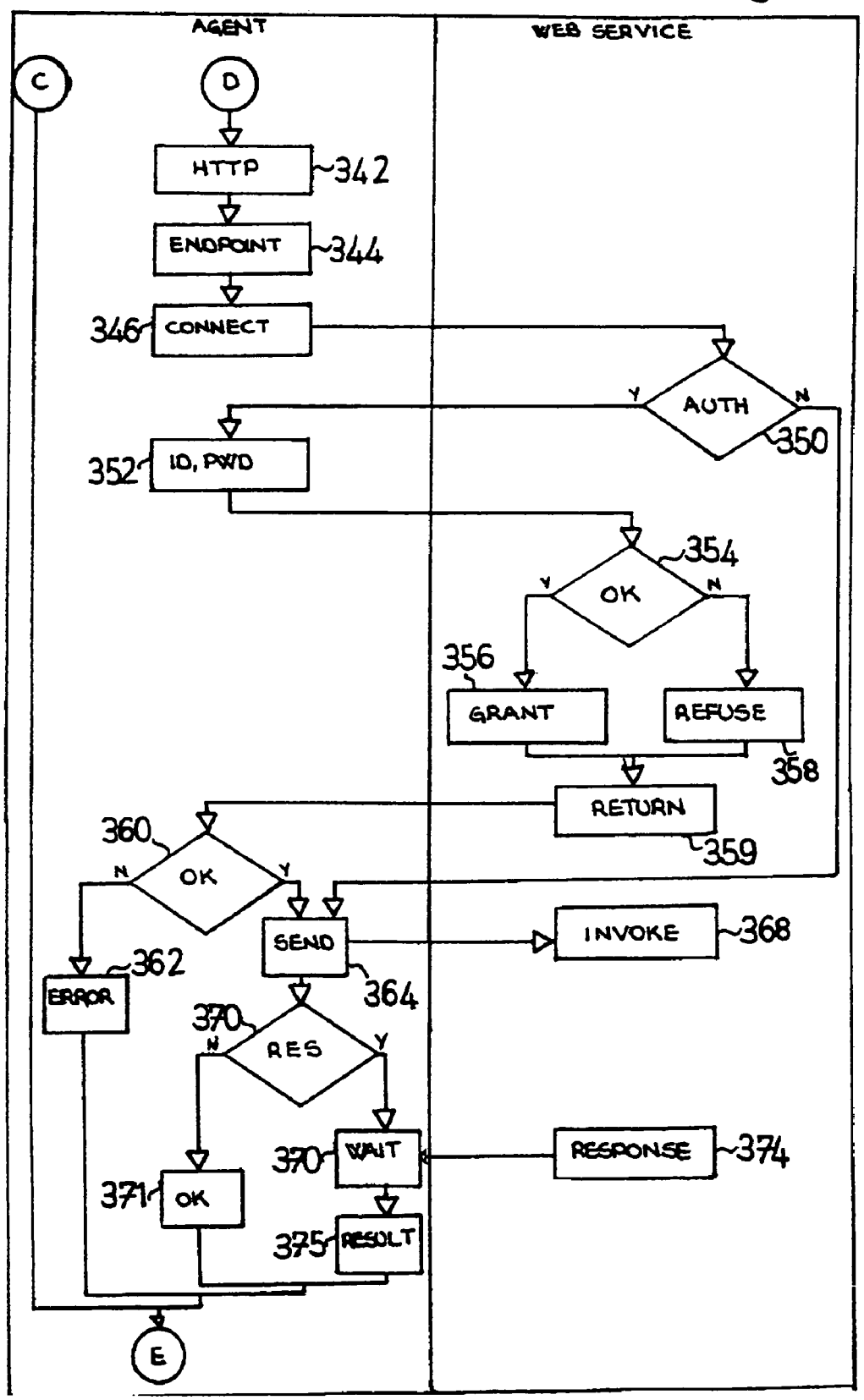
Figure 3C:
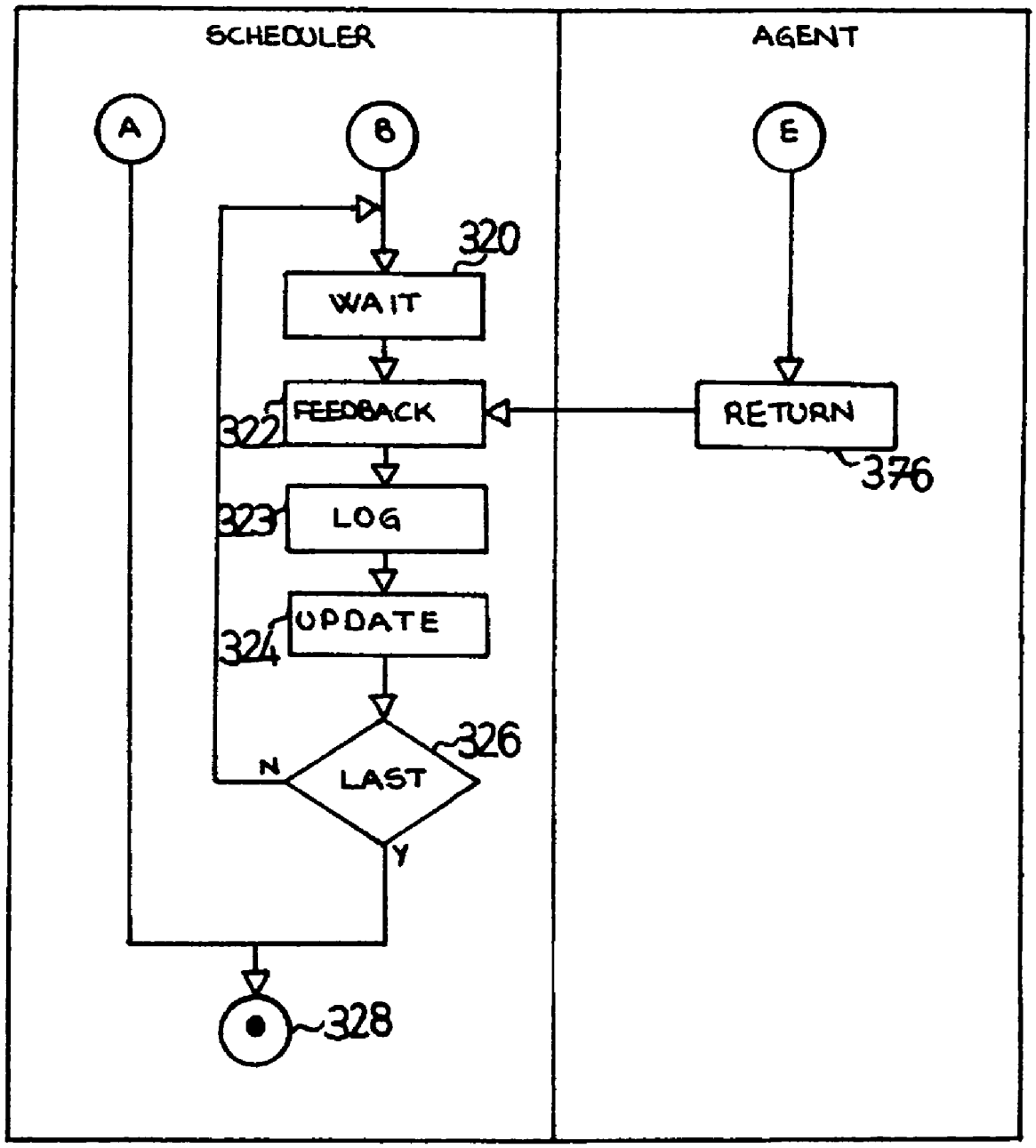

With reference now to FIGS. 3a-3c, a method 300 that is performed in the above-described infrastructure begins at the black start circle 302 in the swim-lane of the scheduler. Continuing to block 304, the desired (local and remote) jobs are defined in the workload database (entering the corresponding descriptor, the planned time of execution, and any dependency from other jobs or resources). The process passes to block 306, wherein a new plan is created (or an existing plan is updated) specifying the flow of execution of the desired jobs. The plan can now be submitted for execution by the controller at block 308.

The flow of activities then includes two branches that are performed concurrently. A first branch consists of blocks 310-318, and a second branch consists of blocks 320-326; the two branches joint at concentric white/black stop circles 328.

Considering in particular the branch 310-318, the executor at block 310 identifies the jobs that are available for running (according to their planned time of execution and their dependencies). For each available job, the associated descriptor is retrieved from the workload database at block 312. Proceeding to block 314, the agent delegated to the execution of the job is extracted from the descriptor. The method then passes to block 316, wherein the executor sends a request of execution of the job to the associated agent (which request of execution includes the corresponding descriptor). The executor then verifies at block 318 whether all the jobs of the plan have been submitted. If not, the flow of activities returns to block 310 for repeating the operations described above on the jobs of the plan still to be submitted. Conversely, the execution of the branch ends at the stop circles 328.

At the same time, in the other branch 320-326 the executor is in a waiting condition at block 320. As soon as a generic job terminates its execution, the corresponding feedback information is received from the respective agent at block 322. Continuing to block 323, the feedback information is passed by the executor to the controller, and then logged onto the workload database. Moreover, the controller at block 324 updates the estimated duration of the job in the workload database accordingly; for example, the estimated duration is calculated as a running average of the values that have been measured for the completed instances of the job (preferably filtering very different values as anomalies). A test is then made at block 326 to determine whether all the jobs of the plan have been terminated. If not, the flow of activities returns to block 320 waiting for the completion of a further job. Conversely, the execution of the branch ends at the stop circles 328.

Moving now to the swim-lane of a generic agent, decision block 330 is entered in response to the request of execution of a job. The flow of activities then branches according to the type of job. Particularly, if the job is local the blocks 332-334 are executed, whereas if the job is remote the blocks 336-375 are executed; in both cases, the method then joints at block 376.

Considering now block 332 (local job), the steps of the job specified in the descriptor are executed under the control of the agent directly. As soon as the job completes, the return code of the job and the resulting output data are collected by the agent at block 334. The flow of activities then descends into block 376.

On the other hand, when the job is remote the agent at block 336 downloads the WSDL document of the associated web service from the URI specified in the descriptor. Proceeding to block 338, any symbolic variable in the payload information of the descriptor is resolved into an actual value. The payload information so obtained is then validated at block 340; in other words, the agent verifies whether the payload information is compliant with the corresponding definition provided in the WSDL document. Assuming that the payload information is formally correct, a corresponding SOAP request is built at block 341 (according to the binding specified in the WSDL document). The SOAP request is then embedded into a HTTP message at block 342.

The address of the endpoint implementing the desired operation is identified at block 344 (as defined in the WSDL document). Continuing to block 346, the agent opens a connection with the endpoint. In response thereto, if the endpoint requires an authentication procedure (decision block 350), a corresponding request is returned to the agent. In this case, the agent at block 352 transmits the userid and the password provided in the descriptor to the endpoint. Returning to the swim-lane of the endpoint, a test is made at block 354 to determine whether a user identified by the information received from the agent is authorized to access the endpoint. If so, the access is granted at block 356; conversely, the access is denied at block 358. In both cases, the result of the authentication procedure is returned to the agent at block 359. In response thereto, decision block 360 in the swim-lane of the agent is entered. If the access to the endpoint has been denied, the agent at block 362 sets the return code of the job to an error value; the process then descends into block 376 directly. Conversely, if the access to the endpoint has been granted the flow of activities continues to block 364; the same point is also reached from decision block 350 when the endpoint does not require any authentication procedure.

Considering block 364, the SOAP request is transmitted to the endpoint. In response thereto, the endpoint at block 368 interprets the SOAP request and invokes the desired web service. Referring back to the swim-lane of the agent, the method branches at block 370 according to the type of operation. If the WSDL specifies that the operation does not return any response, the return code of the job is set to a value indicating its completion at block 371. Conversely, the agent enters a waiting condition at block 372. As soon as the endpoint returns the SOAP response (block 374), the agent at block 375 interprets the received message according to its definition in the WSDL document. Particularly, if the web service provides the expected output message the return code of the job is set to the completion value; conversely, if the web server provides a fault message the return code of the job is set to the error value. In both cases, the information extracted from the received message is dumped to a standard output of the job. The flow of activities then joints at block 376.

With reference now to block 376, the feedback information relating to the execution of the job (i.e., the steps of the local job or the invocation of the web service) is returned to the scheduler (see block 322 in the corresponding swim-lane).

For example, let us consider the following WSDL document (stored at the URI "rateWSDL"):

```
<definitions name=rateName targetNamespace=rateNamespace
<types>
    <schema targetNamespace=rateSchema
        <element name="rateInput">
            <complexType>
                <all>
                    <element name="currency"
                    type="string"/>
                </all>
            </complexType>
        </element>
        <element name="rateOutput">
            <complexType>
                <all>
                    <element name="rate"
                    type="float"/>
                </all>
            </complexType>
        </element>
    </schema>
</types>
<message name="getRateInput">
    <part name="body"
    element="rateInput"/>
</message>
<message name="getRateOutput">
    <part name="body"
    element="rateOutput"/>
</message>
<portType name="ratePortType">
    <operation name="getRate">
        <input message="getRateInput"/>
        <output message="getRateOutput"/>
    </operation>
</portType>
<binding name="rateBinding" type="ratePortType">
    <soap:binding style="document"
    transport="htttt://schemas.xmlsoap.org.soap/http"/>
    <operation name="getRate">
        <soap:operation soapAction=myAction/>
        <input>
            <soap:body use="literal"/>
        </input>
        <output>
            <soap:body use="literal"/>
        </output>
    </operation>
</binding>
<service name="rateService">
    <documentation>
        Return the exchange rate of a desired currency
    </documentation>
    <port name="ratePort" binding="rateBinding">
        <soap:address location="rateLocation"/>
    </port>
</service>
</definitions>
```

The WSDL document ("rateName" at "rateNamespace") defines a very simple service ("rateService"), which is provided by the endpoint at the address "rateLocation" using the SOAP over the HTTP. The service "rateService" includes the port "ratePort" with the binding "rateBinding"; the port "ratePort" supports an operation "getRate". The operation "getRate" receives a SOAP request ("getRateInput") including an input parameter "rateInput" of the string type, representing a selected currency, and returns an output parameter "rateOutput" of the float type, representing its exchange rate (both parameters conforming to the schema "rateSchema").

Assuming that the above-described web service must be scheduled for execution (such as every day), a corresponding job is defined in the workload database. For example, the descriptor of the job includes the following information:
agent=rateAgent
WSDLDocument=rateWSDL userid=rateUserid
password=ratePassword
serviceNameSpace=rateNamespace
serviceName=rateService
portName=ratePort
operationName=getRate
messageContent=<rateInput>$VAR</rateInput>

In the example at issue, the input parameter "rateInput" is defined by a symbolic variable ("$VAR"), which is set to an identifier of the desired currency every time the web service is invoked.

The job is scheduled for execution repeatedly, every time for a different currency. Whenever the remote job is submitted, the scheduler sends the descriptor to the associated agent "rateAgent". The agent resolves the symbolic variable "$VAR" into an actual value (for example, "USD"). The corresponding SOAP request is then built and embedded into the following HTTP message:

```
POST
Host: rateLocation
Content-Type: text/xml; charset="utf-8"
Content-Length: ....
SoapAction: myAction
<CRLF>
<env:Envelope
xmls:env="http://schemas.xmlsoap.org/soap/envelope/">
    <env:Body>
        <m:getRateInput xmlns:m=rateNamespace>
            <m:currency>USD</m:currency>
        </m:getRateInput>
    </env:Body>
</env:Envelope>
<CRLF>
```

The agent then opens a HTTP connection with the endpoint "rateLocation". In response to a corresponding request from the endpoint, the agent provides the userid "rateUserid" and the corresponding password "ratePassword". The above-described HTTP message is then transmitted. The WSDL document specifies that the Web Service must return a response; therefore, the agent waits for a HTTP message with the following format:

```
Content-Type: text/xml; charset="utf-8"
Content-Length: ....
<CRLF>
<env:Envelope
xmls:env="http://schemas.xmlsoap.org/soap/envelope/">
    <env:Body>
        <m:getRateOutput xmlns:m=rateNamespace>
            <m:rate>1.1875</m:rate>
        </m:getRateOutput>
    </env:Body>
</env:Envelope>
<CRLF>
```

The SOAP response in the HTTP message indicates than no error occurred, and returns the value (1.1875) of the exchange rate for the desired currency in the output parameter "rate".

Similar considerations apply if an equivalent method is performed, or if some functions are executed by different modules. However, the concepts of the present invention are also applicable when the web service implements other types of operations, when the agent is validated with a different procedure (for example, involving the use of a digital certificate), and the like.

More generally, the present invention proposes a method of scheduling execution of work units in a data processing infrastructure with a distributed architecture. The method includes a series of steps, which are performed under the control of a central scheduling application. The method starts associating one or more work units with a descriptor; the descriptor includes an indication of an external service that is accessible according to a predefined interface document. The work units are then submitted for execution according to a predefined plan. The method continues retrieving the interface document of each external service associated with the submitted work units. A request message is then built for each external service associated with the submitted work units according to the corresponding interface document. The method ends sending each request message to the corresponding external service, in order to cause the invocation of the external service.

The proposed solution enables the scheduler to manage external services.

Particularly, this allows the scheduler to invoke the external services in a very simple manner.

Therefore, the method of the invention is well suited to be used in heterogeneous environments.

The devised technique supports the integration of the scheduler with the external services.

In this way, the additional functions already available in the scheduler can be readily exploited for managing the external services. For example, it is possible to handle temporal and predecessor constraints, to control and monitor the operations performed by the scheduler through its GUI, or to exploit performance monitoring, load balancing and reporting functions (even if the use with schedulers providing other functions is not excluded).

The preferred embodiment of the invention described above offers further advantages.

Particularly, the web server returns a response message to the agent (which response message is interpreted according to its definition in the corresponding WSDL document).

In this way, a complete communication loop is closed between the scheduler and the web servers.

Advantageously, the content of the request message is included in the descriptor and it is then embedded into the corresponding structure specified in the associated WSDL document.

The proposed technique is very simple, but at the same time effective.

As a further enhancement, the content of the request message includes one or more symbolic variables, which are resolved into actual values at run-time.

This feature increases the flexibility to the method (for example, allowing the same web service to be invoked repeatedly with different input parameters).

However, the solution according to the present invention leads itself to be implemented even with web services that do not return any response message. Alternatively, the request message is built in a different way; for example, in another embodiment of the invention the descriptor stores the actual request message directly (which is simply retrieved by the agent and sent to the corresponding web service). Moreover, the symbolic variables can be resolved by the scheduler, or the content of the request message stored in the descriptor can only consist of static input parameters.

In a preferred implementation of the invention, the submission of the jobs is controlled by the scheduler and their actual execution is controlled by one or more agents.

The proposed architecture makes it possible to exploit pre-existing schedulers (simply defining specific jobs in the workload database for the invocation of the web services).

The task of controlling the interaction with the web services is instead entrusted to the agents, which can be simply plugged into a standard infrastructure.

A suggested choice for associating each remote job with the WSDL document of the corresponding web server consists of storing its address into the respective descriptor.

This feature ensures that the agents always access the up-to-date version of the desired WSDL documents.

A way to further improve the solution is to include authentication information into the descriptor, which authentication information is then used by the web server to authorize its invocation by the agent.

In this way, the scheduling of the web services can be completely automated without any security concern.

Without detracting from its general applicability, the method of the invention is specifically designed for invoking web services.

Indeed, the devised solution is an important step in the move to distributed computing on the INTERNET. Particularly, the method of the invention facilitates the full exploitation of the INTERNET (for example, allowing the interoperability of legacy applications with web services provided by third parties).

However, the solution according to the present invention is also suitable to be implemented with scheduling applications having a different architecture (for example, wherein the whole processing logic is embedded into the scheduler). Alternatively, copies of the WSDL documents are stored locally (and the corresponding addresses are specified in the descriptors), or the WSDL documents are embedded into the descriptors directly; for example, this approach can be useful when the WSDL documents of some web services are not published in the INTERNET. In any case, the proposed method is also applicable to different standardized services (such as the ones conforming to the EDI specification), or more generally to the scheduling of any external services.

Advantageously, the solution according to the present invention is implemented with a computer program, which is provided as a corresponding product embodied in a suitable medium.

Alternatively, the program is pre-loaded onto the harddisks, is sent to the computers through the INTERNET, is broadcast, or more generally is provided in any other form directly loadable into the working memories of the computers. However, the method according to the present invention leads itself to be carried out with a hardware structure (for example, integrated in chips of semiconductor material), or with a combination of software and hardware.

Naturally, in order to satisfy local and specific requirements, a person skilled in the art may apply to the solution described above many modifications and alterations all of which, however, are included within the scope of protection of the invention as defined by the following claims.

The invention claimed is:

1. A method of scheduling execution of a set of work units in a data processing infrastructure with a distributed architecture, the method, under control of a central scheduling application, comprising:

submitting, by a scheduler, the set of work units for execution according to a predefined plan, wherein the central scheduling application comprises the scheduler and a set of agents, for each work unit in the set of work units, identifying, by the scheduler, a descriptor associated with each work unit, wherein the descriptor identifies an external service within a set of external services that is to execute the work unit and wherein the descriptor further comprises an indication of an agent in the set of agents that is associated with the work unit, sending, the scheduler a request of execution of the work unit to the agent, wherein the request of execution comprises an indication of the descriptor, retrieving, by the agent, an interface document of the external service, building, by the agent, a request message for the work unit according to the interface document, and sending, by the agent, the request message to the external service to cause invocation of the external service in response to the request of execution.

2. The method according to claim 1, further comprising:

receiving a response message from the external service being invoked, and interpreting the response message according to the interface document.

3. The method according to claim 1, wherein the interface document specifies a structure of the request message, wherein the descriptor further comprises an indication of a content of the request message, an wherein building the request message further comprises:

embedding the content of the request message into the structure of the request message.

4. The method according to claim 3, wherein the indication of the content of the request message comprises a set of input parameters to be passed to the external service, wherein at least one input parameter of the set of input parameters is a symbolic variable, and wherein building the request message further comprises:

resolving the symbolic variable into an actual value.

5. The method according to claim 1, wherein the descriptor identifies an address of an external location in the external service where the interface document is stored and wherein retrieving the interface document further comprises:

downloading the interface document from the external location.

6. The method according to claim 1, wherein the descriptor comprises authentication information for the external service and wherein the method further comprises:

sending the authentication information to the external service, wherein the invocation of the external service is authorized according to the authentication information.

7. The method according to claim 1, wherein the external service is a web service.

* * * * *